(12) United States Patent
Manzanares et al.

(10) Patent No.: US 6,467,363 B2
(45) Date of Patent: Oct. 22, 2002

(54) BALL SCREW ACTUATOR LOCKING MECHANISM

(75) Inventors: David J. Manzanares, Sandy, UT (US); Scott A. Lee, Erda, UT (US)

(73) Assignee: Moog Inc., East Aurora, NY (US)

( * ) Notice: Subject to any disclaimer, the term of this patent is extended or adjusted under 35 U.S.C. 154(b) by 36 days.

(21) Appl. No.: 09/778,600

(22) Filed: Feb. 7, 2001

(65) Prior Publication Data

US 2002/0104394 A1 Aug. 8, 2002

(51) Int. Cl.[7] .............................................. F16H 25/22
(52) U.S. Cl. .................................................. 74/89.39
(58) Field of Search ........................................ 74/89.39

(56) References Cited

U.S. PATENT DOCUMENTS

| | | | | |
|---|---|---|---|---|
| 1,419,058 A | * | 6/1922 | Klausmeyer | 74/89.39 |
| 2,758,485 A | * | 8/1956 | Jahnel | 74/89.39 |
| 2,875,631 A | * | 3/1959 | Syring | 74/89.39 |
| 4,149,430 A | * | 4/1979 | F'Geppert | 74/89.39 |

* cited by examiner

*Primary Examiner*—David Fenstermacher
(74) *Attorney, Agent, or Firm*—Phillips, Lytle, Hitchcock, Blaine & Huber LLP

(57) ABSTRACT

The present invention provides an improved standby locking mechanism (20) that is adapted to be used with a ball screw actuator. The actuator has a rotatable screw shaft (21) and has a primary nut (22) mounted on a movable member (23) and threadedly engaging the screw shaft. The standby locking mechanism (20) is also mounted on the member (23) and is operatively arranged to prevent further axial or rotative movement of the screw shaft in the event of a failure of the primary nut. The standby locking mechanism includes a sensing mechanism (30) for sensing a failure of the primary nut, and locking mechanisms (29L, 29R) responsive to the sensing mechanism for selectively locking the screw shaft to the member upon a sensed failure of the primary nut.

10 Claims, 1 Drawing Sheet

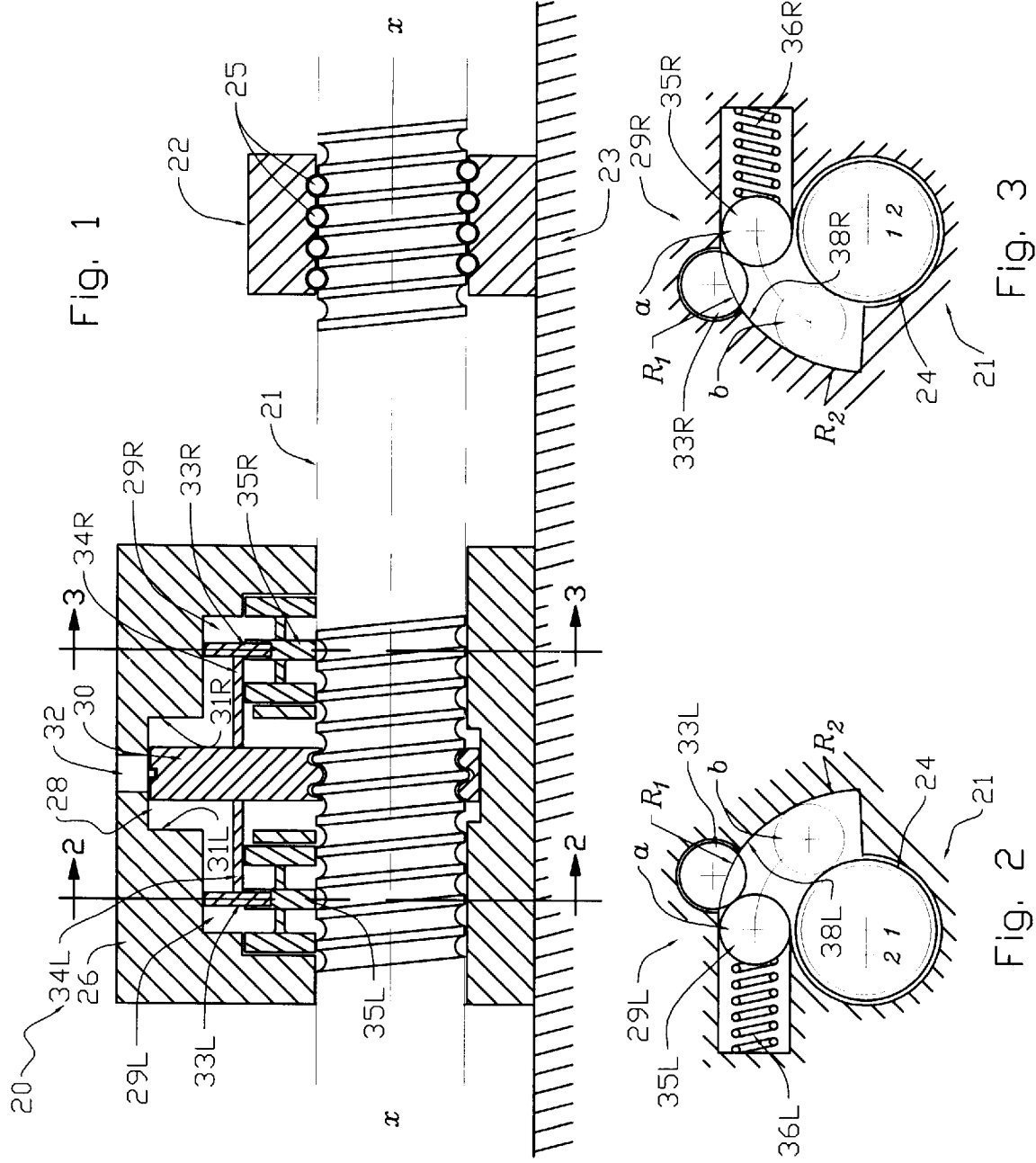

BALL SCREW ACTUATOR LOCKING MECHANISM

TECHNICAL FIELD

The present invention relates generally to ball screw actuators, and, more particularly, to an improved lock mechanism that is operatively associated with a ball screw actuator to selectively lock the screw shaft against further rotational or axial movement in the event of a failure of the primary nut or its attaching structure.

BACKGROUND ART

This invention relates generally to ball screw actuators for flight-critical aircraft control surfaces operating through a primary structural load path. The invention relates to a locking device that provides an emergency secondary structural load path that automatically carries the load in the event of certain failures in the primary load path.

The locking mechanism provides a positive connection between the screw shaft and the associated control surface in the event of a failure of the primary nut or its attaching structure. The locking mechanism is unloaded in normal operation, but locks the screw to the supporting member at the position of failure.

Previous attempts to solve this problem have typically used secondary nuts with free play on the screw which are deliberately configured to jam when loaded. However, some of these may have been unreliable. The present invention offers an improvement which is more complex, but, on the other hand, is highly reliable.

DISCLOSURE OF THE INVENTION

With parenthetical reference to the corresponding parts, portions or surfaces of the disclosed embodiment, merely for purposes of illustration and not by way of limitation, the present invention provides an improvement in a device having a rotatable screw shaft and having a primary nut mounted on a movable member and threadedly engaging the screw shaft.

The improvement broadly comprises a standby locking mechanism (20) mounted on the member and operatively arranged to selectively lock the screw shaft (21) to the member (23) in the event of a failure of the primary nut (22). The standby locking mechanism includes a sensing mechanism (30) for sensing a failure of the primary nut, and at least one locking mechanism (29L or 29R) responsive to the sensing mechanism for selectively locking the screw shaft to the member upon a sensed failure of the primary nut. The standby locking mechanism may include a body (26) mounted on the movable member. It may further include an element (30) operatively engaging the screw shaft, and movably mounted on the body to sense axial movement of the screw shaft thread relative to the body from an initial position determined by the normal engagement of the screw shaft with the primary nut. Normally this element does not physically contact the shaft when the sensing mechanism is in its initial position. The improvement may further include a holding mechanism for releasably holding the element in its initial position. This holding mechanism may be a shear pin (32). However, in an alternative arrangement, it might well comprise a detent spring acting between the body and the element.

The locking mechanism includes at least one spring-biased member (35L, 35R) operatively arranged to selectively wedge between the body and the screw shaft to prevent further relative unidirectional movement therebetween. The locking mechanism may be prevented from wedging between the body and screw shaft by a trigger mechanism (33L, 33R) acting between the sensing mechanism and the locking mechanism.

Accordingly, the general object of the invention is to provide an improved ball screw actuator locking mechanism.

Another object is to provide an auxiliary locking mechanism for a ball screw, which does not interfere with, or frictionally impede, normal operation of the ball screw actuator.

Another object is to provide a ball screw actuator locking mechanism having means for sensing a failure of the primary nut, and for locking the ball screw against rotation in either direction in the event of a sensed failure of the primary nut.

Still another object is to provide a locking mechanism having an alternate structural load path to provide a positive connection between the screw shaft and the associated control surface in the event of a failure of the primary nut or its attaching structure.

These and other objects and advantages will become apparent from the foregoing and ongoing written specification, the drawings, and the appended claims.

BRIEF DESCRIPTION OF THE DRAWINGS

FIG. 1 is a fragmentary longitudinal vertical sectional view of a portion of an improved ball screw actuator, this view showing the rotatable screw shaft, the primary nut and the standby locking mechanism.

FIG. 2 is a fragmentary transverse vertical sectional view thereof, taken generally on line 2—2 of FIG. 1, showing the leftward spring-biased spool-like locking member.

FIG. 3 is a fragmentary transverse vertical sectional view thereof, taken generally on line 3—3 of FIG. 1, showing the rightward spring-biased spool-like locking member.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, the present invention broadly provides an improved ball screw actuator locking mechanism, generally indicated at 20.

Mechanism 20 is shown as being operatively associated with a screw shaft, generally indicated at 21, which is mounted for rotation about horizontal axis x-x but is constrained from moving axially by bearing means (not shown), and is operatively associated with a primary nut, generally indicated at 22. Nut 22 is mounted on a movable member 23 and is in meshing engagement with shaft 21. The screw shaft is adapted to be rotated in the appropriate angular direction by suitable means (not shown). The screw shaft has an externally threaded outer surface 24. A plurality of balls, severally indicated at 25, are operatively captured between the inwardly-facing threaded portion of nut 22 and screw shaft threads 24. Thus, as the screw shaft is rotated, nut 22 and member 23 are translated in an axial direction, either leftwardly or rightwardly depending upon the direction of screw shaft rotation.

The improved locking mechanism 20 is shown as having a body 26 mounted on member 23 for movement therewith. Thus, mechanism 20 and primary nut 22 are constrained to move in the same axial direction in response to rotation of the screw shaft.

Locking mechanism 20 broadly includes a sensing mechanism, generally indicated at 28, mounted within the body for selective axial movement relative thereto, and left and right locking mechanisms 29L, 29R, respectively, arranged between the body and the screw shaft.

The body is shown as having a generally rectangular outline or profile, but has an internal cavity in which the sensing mechanism is operatively mounted. The sensing mechanism includes a central plate-like element 30 which is mounted within the body for possible axial movement between left and right body stops 31L, 31R, respectively. Element 30 has a complimentarily-configured internal thread that is adapted to envelop, but normally not contact, the shaft screw thread 24. Element 30 is normally retained in a centered position between body stop surfaces 31L, 31R by means of a shear pin 32 acting between body 26 and element 30. When in this centered position, the inwardly-facing threads on the element have a clearance fit with the shaft threads 24. Hence, there is normally no physical contact between the element and the screw thread, and the standby locking mechanism does not contribute any frictional load to the operation of the ball screw actuator.

Left and right trigger disks 33L, 33R are connected to sensing element 30 by means of left and right shafts 34L, 34R respectively. These shafts are simply horizontally-elongated cylindrical rods, and the trigger disks are in the form of plate-like cylindrical disks mounted on the distal ends of these rods.

The left and right locking mechanisms 29L, 29R are shown as including spool-like devices 35L, 35R, respectively. Each of these devices somewhat resembles a three-lobed spool, with three axially-spaced cylindrical disks being joined by intermediate cylindrical rods. As best shown in FIGS. 2 and 3, these two spool-like members 35L, 35R are biased to move rightwardly and leftwardly, respectively, by means of springs 36L, 36R, respectively. When sensing element 30 is in its centered position, as normally established by the shear pin, the left and right disk elements 33L, 33R, will bear against the outer peripheral surfaces of the middle lobes of locking members 35L, 35R, respectively, to hold the locking members in positions a and thus prevent the locking members from contacting the surface of screw 21.

However, in the event of a failure of the primary nut, such as by the balls 25 separating from the raceway, such that the screw shaft moves axially relative to nut 22, such axial movement of screw shaft 21 relative to the primary nut and the body of the standby locking mechanism, will cause sensing element 30 to move axially either leftwardly or rightwardly, shearing pin 32. If the sensing element 30 so moves, either leftwardly or rightwardly, by a sufficient amount, then disk-like trigger members 33L, 33R will align with the spaces between the lobe-like disks of spool members 35L, 35R, respectively. This will permit the springs to expand, to urge their respective spool-like members to move to the alternative positions b shown in FIGS. 2 and 3 so as to wedge between body cam surfaces 38L, 38R, respectively and the screw shaft. These cam surfaces have upper portions of radius $R_1$ generated about point 1, and have lower portions of radius $R_2$ generated about point 2. The intermediate portion is generally in smooth continuous transition between these two radii. This wedging action will therefore lock the screw to body 26, and will prevent further rotation of the screw shaft. This wedging action will thereafter prevent the screw shaft from moving rotationally or axially relative to body 20 and member 23.

As comparatively illustrated in FIGS. 2 and 3, the locking mechanisms are arranged as mirror images of one another such that one of the locking mechanisms will prevent the screw shaft from further rotation in one angular direction, while the other will prevent the screw shaft from further rotation in the opposite angular direction.

MODIFICATIONS

The present invention expressly contemplates that other types of mechanisms may be substituted to perform the functions previously described. For example, the shaft lock elements might alternatively be pawls carried on pivots adjacent the shaft. The failure sensing member might be in the form of partial nut segments, or even a pivoted finger, engaging the shaft thread. The failure sensing element holding mechanism might be a spring-loaded detent in lieu of a shear pin. The shaft may have a ball screw, an acme screw, a roller screw, a power screw, or some other type of threaded engagement with the nut.

Therefore, while the presently-preferred form of the improved ball screw actuator locking mechanism has been shown and described, and several modifications thereof discussed, persons skilled in this art will readily appreciate that additional changes and modifications may be made without departing from the spirit of the invention, as defined and differentiated by the following claims.

What is claimed is:

1. In a device having a rotatable screw shaft and having a primary nut mounted on a movable member and threadedly engaging said screw shaft, the improvement comprising;

a standby locking mechanism including a body mounted on said member and operatively arranged to selectively lock said screw shaft to said member in the event of a failure of said primary nut, said standby locking mechanism including a sensing mechanism for sensing a failure of said primary nut, said sensing mechanism including an element operatively engaging said screw shaft and movably mounted on said body to sense relative axial movement of the thread on said screw shaft relative to said body from an initial position determined by the normal engagement of said screw shaft with said primary nut;

a trigger mechanism acting between said sensing mechanism and said locking mechanism; and a locking mechanism responsive to said trigger mechanism for selectively locking said screw shaft to said member upon a sensed failure of said primary nut.

2. The improvement as set forth in claim 1 wherein said screw shaft and nut are contained within a ball screw.

3. The improvement as set forth in claim 1 wherein said element does not physically contact said shaft when said sensing mechanism is in said initial position.

4. The improvement as set forth in claim 3 and further comprising a holding mechanism for releasably holding said element in said initial position.

5. The improvement as set forth in claim 4 wherein said holding mechanism includes a shear pin acting between said body and said element.

6. The improvement as set forth in claim 1 wherein said locking mechanism is operatively arranged to selectively lock said screw thread against relative axial or rotational movement relative to movable member.

7. The improvement as set forth in claim 1 wherein said locking mechanism includes at least one spring-biased member operatively arranged to selectively wedge between said body and said screw shaft to prevent relative unidirectional movement therebetween.

8. The improvement as set forth in claim 7 wherein said locking mechanism is prevented from wedging between said body and said screw shaft by said trigger mechanism.

9. The improvement as set forth in claim 7 wherein said locking mechanism includes a first said member that is adapted to selectively wedge between said body and said screw shaft to prevent relative rotation therebetween in one angular direction.

10. The improvement as set forth in claim 7 wherein said locking mechanism includes a second said member that is adapted to selectively wedge between said body and said screw shaft to prevent relative rotation therebetween in the opposite angular direction.

* * * * *